US011336637B2

(12) United States Patent
Rubinstein et al.

(10) Patent No.: US 11,336,637 B2
(45) Date of Patent: *May 17, 2022

(54) USING SOCIAL GRAPH FOR ACCOUNT RECOVERY

(71) Applicant: Meta Platforms, Inc., Menlo Park, CA (US)

(72) Inventors: Yigal Dan Rubinstein, Los Altos, CA (US); Jacob Andrew Brill, San Francisco, CA (US); Arturo Bejar, Saratoga, CA (US); Jonathan H. Frank, Mountain View, CA (US); David Breger, Berkeley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/467,891

(22) Filed: Mar. 23, 2017

(65) Prior Publication Data

US 2017/0195315 A1 Jul. 6, 2017

Related U.S. Application Data

(63) Continuation of application No. 12/978,327, filed on Dec. 23, 2010, now Pat. No. 9,626,725.

(51) Int. Cl.
*H04L 29/06* (2006.01)
*H04L 51/00* (2022.01)
(Continued)

(52) U.S. Cl.
CPC ............ *H04L 63/083* (2013.01); *G06Q 50/01* (2013.01); *H04L 51/12* (2013.01); *H04L 51/32* (2013.01)

(58) Field of Classification Search
CPC ......... H04L 29/06782; H04L 29/06789; H04L 29/06795; H04L 29/06816;
(Continued)

(56) References Cited

U.S. PATENT DOCUMENTS 8,108,414 B2 * 1/2012 Stackpole ........... G06F 17/3087
707/758
8,306,256 B2 11/2012 Muriello et al.
(Continued)

OTHER PUBLICATIONS

U.S. Office Action, U.S. Appl. No. 12/978,327, filed May 5, 2016, 35 pages.
(Continued)

*Primary Examiner* — Dhairya A Patel
(74) *Attorney, Agent, or Firm* — Fenwick & West LLP

(57) ABSTRACT

A social networking system performs account recovery for a user with the help of the user's connections (e.g., friends). The social networking system selects connections of the user based on information indicating likelihood of real-world interactions between the user and the selected connections. Access codes are sent to the selected connections and the user instructed to obtain access codes from the selected connections via a communication that is outside the social networking system, for example, via phone. The user provides the access codes obtained from the selected connections to the social networking system. If the access codes provided by the user match the access codes sent to the selected connections, the user is granted access to the account. Real-world interactions between two users are determined based on sharing of devices between the users or information indicating presence of the users in the same place during same time interval.

19 Claims, 11 Drawing Sheets

(51) Int. Cl.
*G06Q 50/00* (2012.01)
*H04L 51/52* (2022.01)

(58) Field of Classification Search
CPC ......... H04L 29/06823; H04L 29/06836; H04L 29/0685; H04L 51/12; H04L 51/32; H04L 63/083; G06Q 50/01
See application file for complete search history.

(56) References Cited

U.S. PATENT DOCUMENTS

| | | | |
|---|---|---|---|
| 8,472,662 B2 | 6/2013 | Muriello et al. | |
| 9,064,246 B1* | 6/2015 | Anderson | G06Q 20/00 |
| 9,219,704 B2* | 12/2015 | Hamlin | H04L 51/36 |
| 2006/0248573 A1 | 11/2006 | Pannu et al. | |
| 2007/0240203 A1 | 10/2007 | Beck | |
| 2008/0294663 A1* | 11/2008 | Heinley | G11B 27/34 |
| 2009/0187486 A1 | 7/2009 | Lefenfeld et al. | |
| 2009/0220060 A1* | 9/2009 | Wilson | G06F 21/35 |
| | | | 379/93.03 |
| 2009/0249451 A1 | 10/2009 | Su et al. | |
| 2009/0254358 A1* | 10/2009 | Li | G06Q 10/10 |
| | | | 705/319 |
| 2010/0063993 A1* | 3/2010 | Higgins | G06Q 10/10 |
| | | | 709/203 |
| 2010/0069058 A1* | 3/2010 | Rothschild | H04W 76/10 |
| | | | 455/422.1 |
| 2010/0076850 A1* | 3/2010 | Parekh | G06Q 30/02 |
| | | | 705/14.66 |
| 2010/0115114 A1 | 5/2010 | Headley | |
| 2010/0211575 A1 | 8/2010 | Collins et al. | |
| 2010/0211996 A1 | 8/2010 | McGeehan et al. | |
| 2010/0211997 A1* | 8/2010 | McGeehan | H04L 63/1483 |
| | | | 726/4 |
| 2010/0275250 A1 | 10/2010 | Devadoss et al. | |
| 2010/0287053 A1* | 11/2010 | Ganong | G06K 9/00248 |
| | | | 705/14.66 |
| 2010/0293600 A1* | 11/2010 | Schechter | H04L 63/083 |
| | | | 726/4 |
| 2010/0331146 A1* | 12/2010 | Kil | G06F 19/3481 |
| | | | 482/8 |
| 2011/0034157 A1* | 2/2011 | Walker | H04L 65/1069 |
| | | | 455/417 |
| 2011/0153414 A1 | 6/2011 | Elvekrog et al. | |
| 2011/0161429 A1* | 6/2011 | Marcus | G06Q 10/107 |
| | | | 709/206 |
| 2011/0196923 A1* | 8/2011 | Marcucci | H04L 51/32 |
| | | | 709/204 |
| 2011/0231240 A1* | 9/2011 | Schoen | H04L 51/32 |
| | | | 705/14.41 |
| 2012/0011204 A1* | 1/2012 | Morin | G06Q 10/10 |
| | | | 709/205 |
| 2012/0066053 A1* | 3/2012 | Agarwal | G06Q 50/01 |
| | | | 705/14.41 |
| 2012/0078916 A1* | 3/2012 | Tseng | G06F 16/29 |
| | | | 707/748 |
| 2012/0084160 A1* | 4/2012 | Badros | G06Q 30/0241 |
| | | | 705/14.73 |
| 2012/0124479 A1* | 5/2012 | Morin | G06Q 10/10 |
| | | | 715/741 |
| 2012/0124508 A1* | 5/2012 | Morin | H04L 51/32 |
| | | | 715/781 |
| 2012/0144343 A1 | 6/2012 | Tseng | |
| 2021/0390548 A1* | 12/2021 | Malik | G06Q 20/12 |
| 2021/0390616 A1* | 12/2021 | Sundaramoorthy | G06Q 40/02 |

OTHER PUBLICATIONS

U.S. Office Action, U.S. Appl. No. 12/978,327, filed Aug. 17, 2015, 24 pages.
U.S. Office Action, U.S. Appl. No. 12/978,327, filed Dec. 4, 2014, 19 pages.
U.S. Office Action, U.S. Appl. No. 12/978,327, filed May 21, 2014, 16 pages.

* cited by examiner

USING SOCIAL GRAPH FOR ACCOUNT RECOVERY

CROSS REFERENCE TO RELATED APPLICATIONS

This application is a continuation of U.S. patent application Ser. No. 12/978,327, filed Dec. 23, 2010, and incorporates the contents thereof by reference in its entirety.

BACKGROUND

This invention relates to social networking systems and in particular to determining real-world interactions between users of a social networking system and using the information for account recovery.

An online system, such as a website, that allows users to interact with the system typically creates an account for each user of the system. The user is required to provide authentication information, for example, login and password in order to gain access to the user account. Once the user logs into the account, the user can perform various actions supported by the online system, for example, sending messages to other users, uploading photos, deleting photos, changing profile information, and even making online purchases using the user account.

Hackers often try to gain unauthorized access to user accounts, for example, by stealing authentication information of the user. Once a hacker gets unauthorized access to the user's account, the hacker can use the account for any purpose including illegitimate purposes. For example, the hacker can get the email contacts of the user and send spam messages to the email contacts. The hacker can also include malicious attachments like viruses or uniform resource locator (URL) links with the email. Since the email messages are received by the contacts from the user's account, the message is unlikely to be blocked by a spam filter. Furthermore the recipients are quite likely to open and read the message, possibly click on any URL links provided with the message, or open an attachment in the email. These links and attachments can be potentially harmful to the recipients. Therefore, a person who can get unauthorized access to a user account can perform illegitimate and harmful actions using the account.

Online systems therefore lock a user account if the user account is associated with suspicious activities. For example, if several login attempts are made to access the user account with incorrect passwords, the online system may lock the user account assuming an unauthorized user may have attempted to gain access to the account. However it is possible that the authorized user of the account may have forgotten the password and therefore made multiple attempts to get into the user's own account.

In any case, once the user is locked out of the user account, the user has to provide enhanced authentication to gain access to the user account. Typically the user is required to call and talk to personnel associated with the online service to gain access to the account. The user may be required to provide different types of information verifying the user's authenticity and may even be required to send a copy of a photo id. Some online services do not trust information provided by users on phone and send a new password to the user's address by regular mail.

These procedures for gaining access to a locked account are slow since the user may have to wait several days before the user account is unlocked. Moreover, these procedures require the online service to maintain staff to handle these procedures, thereby increasing the maintenance costs of the online service. Even if the online service maintains a call center to handle these calls, the call center may not be open seven days a week, twenty-four hours a day, and human resources cannot scale as well as computing resources. If the user account gets locked on a weekend or during hours outside the business hours of the call center, the user may have to wait several hours or even days just to be able to talk to an operator to initiate the account recovery process.

SUMMARY

Embodiments of the invention allow recovery of user accounts based on connections of the user in a social networking system. In one embodiment, a request for recovering a user account in the social networking system is received. A set of connections of the user are selected based on information indicating real-world interactions between the user and the selected connections. The real-world interactions comprise interactions between the user and the user's connections that are carried on outside the social networking system. The social networking system sends an access code to each selected connection. The social networking system receives a set of access codes from the user and matches the received access codes with the access codes sent to the selected connections. If one or more access codes received from the user match the access codes sent to the selected connections, the social networking system grants the user, access to the account.

The user may be granted access to the user account if the number of access codes received from the user that match the access codes sent to the connections exceeds a threshold value or a predetermined percentage of the number of access codes sent. In an embodiment, the social networking system also sends instructions to transmit the access codes between the selected connections and the user via communication outside the social networking system, for example, via phone.

The connections of the user that assist the user in the account recovery process may be provided by the user or may be automatically determined by the social networking system. The social networking system can automatically select the connections by determining whether the user and the connections are likely to have real world interactions with each other. The social networking system can determine that the user has real-world interactions with a connection if the user is determined to have shared a device with the connection or if the user is determined to share a location with the connection. Information indicating sharing of location between two users includes both users being tagged in the same photo, both users sending RSVP message for the same event, both users graduating from an educational program in the same year, and the like.

In an embodiment, the social networking system determines clusters of the connections of the user such that users within a cluster share characteristics more than users across clusters. The social networking system ensures that not all selected connections belong to the same cluster. If all selected connections belong to the same cluster the social networking system may require the user to change the selection.

In an embodiment, the social networking system sends a set of access code to the user and receives the access codes from the selected connections. The social networking system matches the received access codes with the access codes that were sent to the user. If one or more access codes received from the user match the access codes that were sent to the user, the social networking system grants access to the account to the user.

The features and advantages described in this summary and the following detailed description are not all-inclusive. Many additional features and advantages will be apparent to one of ordinary skill in the art in view of the drawings, specification, and claims.

Figure 1:
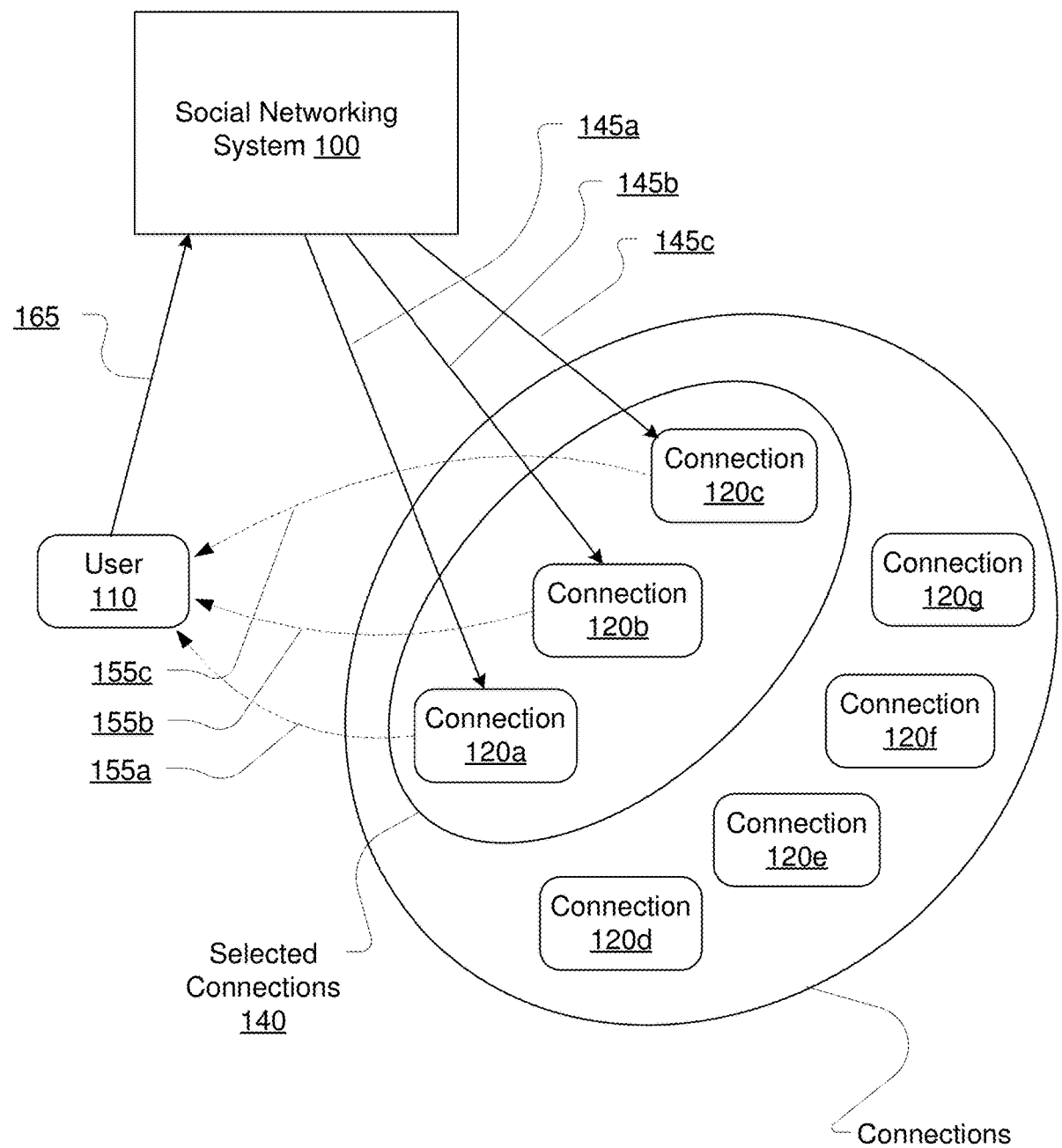
FIG. 1 illustrates how a social networking system can use the connections of a user for recovering an account of the user, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system uses social information associated with a user to assist the user with account recovery. The social networking system initiates the account recovery process if the user account is locked, for example, due to activity indicating unauthorized access or an attempt to gain unauthorized access to the account. As part of the account recovery process, the social network system determines a set of connections of the user with whom the user is likely to have real-world interactions. The social networking system can either automatically select the connections or let the user select the connections. The social networking system sends access codes to the selected connections. The user is required to obtain the access codes from the selected connections and provide them to the social networking system. If the user succeeds in getting more than a threshold number of access codes, the user is granted access to the user's account.

A social networking system allows users to communicate and interact with other users of the social networking system. A user is typically required to create an account with the social networking system to be able to use the functionality provided by the social networking system. A user is required to authenticate in order to gain access to the user account. Once a user gains access to the user account, the user can view or modify the information stored with the user account as well as interact with other users. The social networking system can store information describing the user, for example, the user profile as well as information uploaded by the user including photos can be stored with the user account. A user that joins the social networking system can add connections to other users.

The term "connection" refers to any other user to whom a user has formed a connection, association, or relationship via the social networking system (connections are sometimes referred to herein by using the term "friend"). Connections may be added explicitly by a user, for example, the user selecting a particular other user to connect to, or automatically created by the social networking system based on common characteristics of the users (e.g., users who are alumni of the same educational institution). Users often have a large number of connections even though they may interact with very few of them on a regular basis. Furthermore, a user may have only online interactions with some connections. On the other hand the user may have real-world interactions with some connections, for example, the users may meet each other in person, interact via phone, text messaging, or other mechanisms outside the social networking system.

FIG. 1 illustrates how a social networking system 100 can assist a user 110 with the account recovery process. The social networking system 100 determines that the user account is locked and initiates the account recovery process. In an embodiment, the user 110 may request the social networking system to initiate the account recovery process. The social networking system selects a set 140 of connections 120*a*, 120*b*, 120*c* of the user 110 for assisting the user with the account recovery process. (A letter after a reference numeral, such as "120*a*," indicates that the text refers specifically to the element having that particular reference numeral, while a reference numeral in the text without a following letter, such as "120," refers to any or all of the elements in the figures bearing that reference numeral.)

The selection of the set 140 may be performed by the user 110, manually by selecting the connections from a larger set 130 of connections, for example, the entire set of the user's connections. Alternatively, the social networking system 100 determines the set 140 based on interactions between the user 110 and the connections 120. In an embodiment, the social networking system 100 assists the user 110 in selecting the set 140. For example, if the user 110 has a very large number of connections, the social networking system 100 generates a set 130 of connections from which the user can select the final set 140 of connections 120.

The social networking system 100 sends 145*a*, 145*b*, and 145*c* access codes to the selected connections 120*a*, 120*b*, and 120c respectively. The social networking system 100 may provide instructions to the selected connections 120a, 120b, and 120c to provide the access codes to the user 110, for example, by instructing the connections to provide the access codes via communication that is outside the social networking system 100. A communication is outside the social networking system 100 if the communication does not involve the systems used by the social networking system 100. For example, emails sent using the user accounts in a social networking system 100 are examples if communication based on social networking system 100. On the other hand, a phone communication that does not use the social networking system 100 is outside the social networking system 100. Similarly, text messaging, regular mail, fax or online communications using systems different from the social networking system 100 can be considered outside the social networking system 100. The selected connections 120a, 120b, and 120c of the user provide 155a, 155b, and 155c the access codes to the user 110. Alternatively, the user 110 reaches out to the selected connections 120a, 120b, and 120c to obtain the access codes. It is possible that not all connections 120a, 120b, and 120c may be reachable or available. However, once the user 110 obtains more than a threshold number of access codes from the connections 120a, 120b, and 120c, the user 110 provides 165 the obtained access codes to the social networking system 100. If the user succeeds in obtaining and providing more than a threshold number of access codes correctly to the social networking system 100, the social networking system 100 grants the user 110, access to the user account. If the user 110 does not provide more than the threshold number of access codes to the social networking system 100, the social networking system 100 keeps the account locked. This process assumes that an unauthorized person that gains access to the users account is unlikely to be able to communicate with the selected connections and acquire the access codes.

System Architecture

Figure 2:
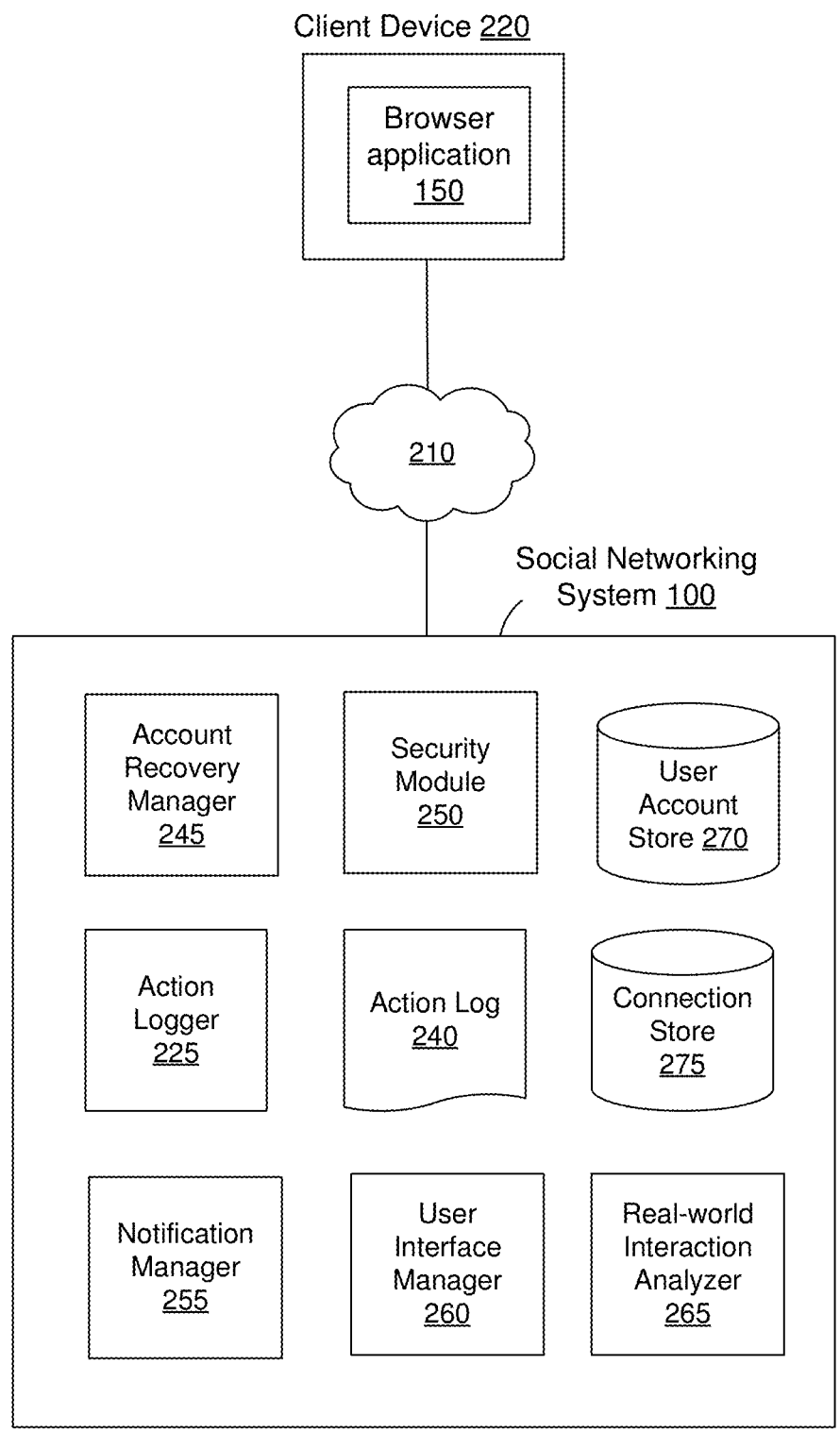
FIG. 2 is a system architecture diagram illustrating a social networking system illustrating modules for performing account recovery, in accordance with an embodiment of the invention.

FIG. 2 shows a system architecture diagram illustrating a social networking system according to an embodiment, illustrating modules for performing account recovery. The system environment comprises one or more client devices 220, a social networking system 100, and a network 210. In alternative configurations, different and/or additional modules can be included in the system.

FIG. 2 contains a block diagram of the social networking system 100. The social networking system 100 includes an account recovery manager 245, an action logger 225, an action log 240, a user account store 270, a connection store 275, a security module 250, a notification manager 255, a user interface manager 260, and a real-world interaction analyzer 265. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 comprises a computing system that allows users to communicate or otherwise interact with each other and access content as described herein. The social networking system 100 stores information describing users in the user account store 270. This information includes biographic, demographic, and other types of descriptive information, such as work experience, educational history, hobbies or preferences, location, and the like.

The social networking system 100 further stores data describing one or more connections between different users in the connection store 275. The connection information may indicate users who have similar or common work experience, group memberships, hobbies, or educational history. Additionally, the social networking system 100 includes user-defined connections between different users, allowing users to specify their relationships with other users. For example, these user defined connections allows users to generate relationships with other users that parallel the users' real-life relationships, such as friends, co-workers, partners, and so forth. Users may select from predefined types of connections, or define their own connection types as needed.

The action logger 225 populates the action log 240 with information about user actions to track them. Any action that a particular user takes with respect to another user is associated with each user's account, through information maintained in a database or other data repository, such as the action log 240. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well. When a user takes an action on the social networking system 100, the action is recorded in an action log 240. In one embodiment, the social networking system 100 maintains the action log 240 as a database of entries.

As discussed above, the social networking system 100 maintains data about objects with which a user may interact on the social networking system 100. To this end, the user account store 270 and the connection store 275 store instances of the corresponding type of objects maintained by the social networking system 100. Each object type has information fields that are suitable for storing information appropriate to the type of object. For example, the user account store 270 contains data structures with fields suitable for describing a user's account. When a new object of a particular type is created, the social networking system 100 initializes a new data structure of the corresponding type, assigns a unique object identifier to it, and begins to add data to the object as needed. This might occur, for example, when a user becomes a user of the social networking system, the social networking system 100 generates a new instance of a user account in the user account store 270, assigns a unique identifier to the user account, and begins to populate the fields of the user account with information provided by the user.

The security module 250 determines if there is any suspicious activity associated with a user account that warrants locking the user account. Examples of suspicious activity detected by the security module 250 include multiple attempts to login using incorrect passwords, spam messages being sent using the user account, for example, messages containing suspicious links or attachments. Suspicious attachments include attachments that are likely to be viruses as determined by the attributes of the attachments, for example, the file name of the attachment, whether the attachment is an executable, etc.

The security module 250 may inspect information available in the action log 240 to determine a history of activities associated with a user account. For example, a user account that is determined to have sent a large number of emails comprising attachments in a very short period of time may be determined to be suspicious. The action log 240 is inspected by the security module 250 to identify information indicative of suspicious activity from the account in the past. If the security module 250 determines significant suspicious activity from an account, the security module 250 can lock the user account. If the security module 250 locks the user account, the user account cannot be accessed by any user including the authorized user without specific authentication. The authentication process followed to unlock the user account is called the account recovery process.

The account recovery manager 245 manages the various steps of the account recovery process. In an embodiment, the account recovery manager 245 sends access codes to a set of selected connections of the user. The account recovery manager 245 waits for the user to obtain the access codes from the selected connections and provide them to the social networking system 100. The account recovery manager 245 compares the access codes received from the user with the access codes sent to the selected connections to verify if the user successfully provided at least a threshold number or percentage of access codes that were sent. If the user provides the required number of access codes, the account recovery manager indicates to the security module 250 that the user can be granted access to the user account.

In one embodiment, the account recovery manager 245 requests the user to provide the set of connections for assisting with the account recovery process for the user. The account recovery manager 245 may obtain the set of connections from the user in advance before any actual need for account recovery. Alternatively the account recovery manager 245 can obtain the set of connections from the user as part of the account recovery process after the user account has been locked. In one embodiment, the account recovery manager 245 obtains a set of connections from the real-world interaction analyzer 265. The real-world interaction analyzer 265 can determine a set of connections with whom the user is likely to interact in real life using communication that does not involve the social networking system 100, or possibly does not involve any online communication. Communication of the user with the real-world connections may involve using a phone, meeting in person, or text messaging. The account recovery manager 245 may obtain a set of connections from the real-world interaction analyzer 265 and present them to the user to allow the user to further select the final list of connections to assist the user with the account recovery process.

The real-world interaction analyzer 265 analyzes social network information associated with a user and the user's connections to determine connections that are likely to interact with the user in real-world outside of the social networking system 100. In an embodiment, the real-world interaction analyzer 265 determines a score indicating the likelihood of the user and the real-world connection interacting in real-world based on information available in the social networking system 100. For example, if two users are tagged in a photo, there is a high likelihood that the users interact with each other in real-world rather than just via the social networking system 100. Other criteria for determining real-world connections of users are further described herein.

The user interface manager 260 determines the appropriate user interface to be presented to the user for interacting with the social networking system. In an embodiment, the user interface is presented to the user via the browser application 150 of the client device 220. Examples of user interfaces presented to the user to allow the user to perform the account recovery process are illustrated in FIG. 4-8.

The notification manager 255 sends notification messages triggered by specific actions in the social networking system 100. For example, if a user account in the social networking system 100 is locked due to suspicious activity associated with the user account, the notification manager 255 sends a notification message informing the user that the user account is locked. Similarly, during the account recovery process, when the user selects a set of connections to assist the user, the notification manager 255 sends messages to the selected connections sending them instructions along with appropriate access codes.

Client devices 220 are computing devices that execute client software, e.g., a web browser or built-in client application, to connect to the user interfaces related to the social networking system 100 and to interact with the social networking system 100. The client device 220 also allows a user to interact with other online systems, for example, to interact with a system that allows the user to send and receive email messages. The client device 110 can be, for example, a personal computer, a personal digital assistant, a cellular, mobile, a smart phone, a laptop computer, a television "set-top box," and the like.

FIG. 2 shows a browser application 150 executing in a client device 220. The browser application may be an internet browser that allows users to browse internet websites. The browser application 150 sends requests to a website or server and receives the response from the website or server. The browser application 150 also provides a user interface for interacting with the social networking system 100. The browser application 150 can display text and graphics to allow the user to input commands that cause requests to be sent to websites.

The network 210 is typically the Internet, but may be any network, including but not limited to a local area network (LAN), a metropolitan area network (MAN), a wide area network (WAN), a mobile wired or wireless network, a private network, or a virtual private network. In one embodiment, the network 210 uses standard communications technologies and/or protocols. For example, the networking protocols used on the network 210 can include the transmission control protocol/Internet protocol (TCP/IP), the hypertext transport protocol (HTTP), the file transfer protocol (FTP), etc. The data exchanged over the network 210 can be represented using technologies and/or formats including the hypertext markup language (HTML), the extensible markup language (XML), etc. In some embodiments, the entities can use custom and/or dedicated data communications technologies instead of, or in addition to, the ones described above.

User Account Recovery Process

Figure 3:
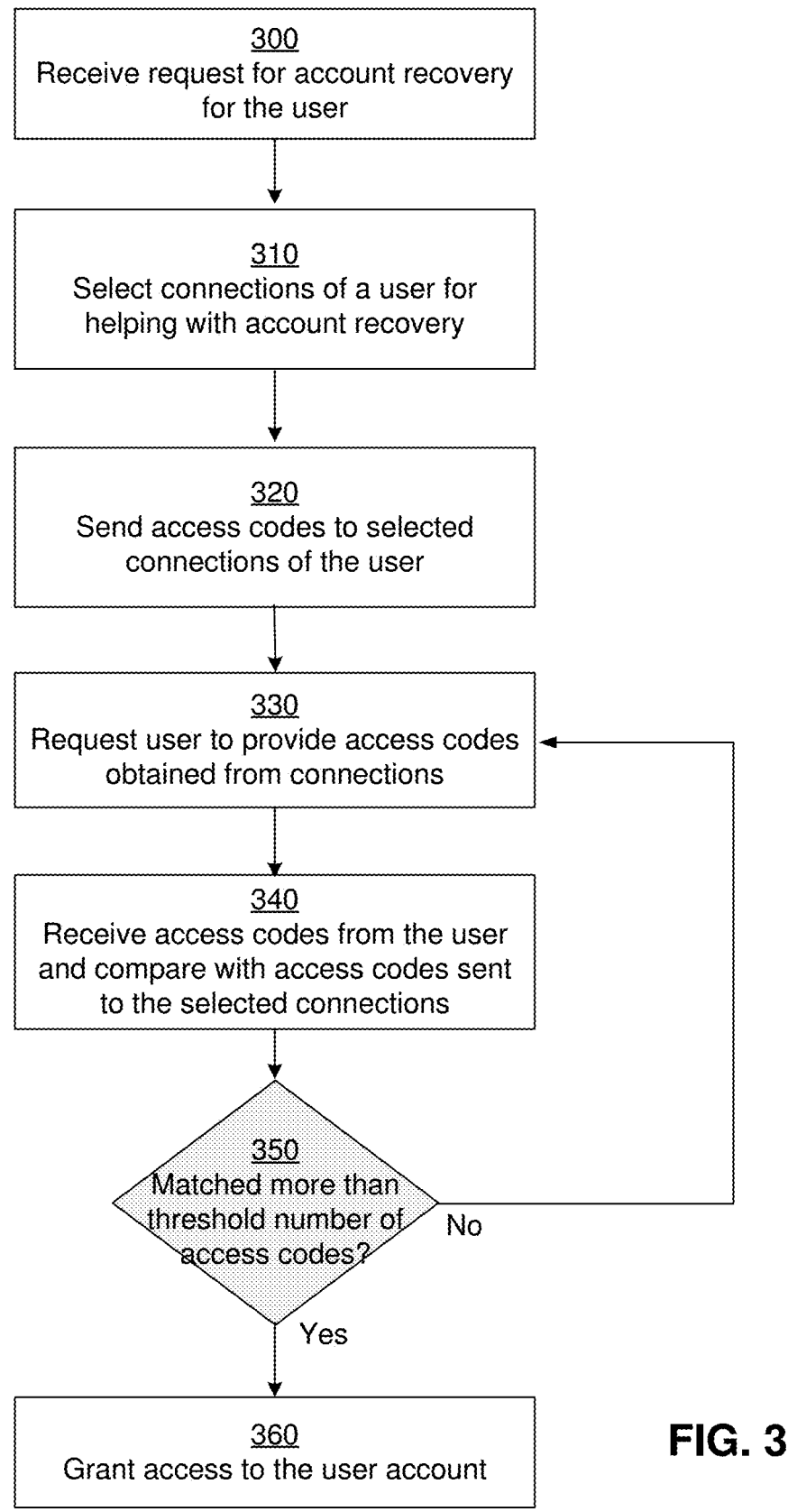
FIG. 3 shows a flowchart of a process for allowing account recovery for a user based on the user's connections, in accordance with an embodiment of the invention.

FIG. 3 is a flowchart of a process for allowing account recovery for a user based on the user's connections, in accordance with an embodiment of the invention. The account recovery manager 245 receives 300 a request for performing account recovery for a user. The social networking system 100 can provide a user interface to allow the user to initiate the account recovery process. The user typically requests account recovery in response to the user's account getting locked due to suspicious activity related to the account. Suspicious activity related to a user account comprises more than a threshold number of attempts to login to the account with incorrect passwords, messages being sent from the account indicating a use that is disallowed or discouraged by the social networking system 100, for example, sending spam messages, attempting to access information that the user is not authorized to access, several failed login attempts, and the like. In an embodiment, responsive to detecting suspicious activity associated with an account the account recovery process may be automatically started by the account recovery manager 245 without an explicit request by the user.

The account recovery manager invokes the real-world interaction analyzer 265 to select 310 a set of connections of the user to assist the user in the account recovery process. In an embodiment, the set of connections of the user may be preselected by the user prior to an actual need for account recovery. For example, the user interface manager 260 may prompt a user that successfully logged in to the social networking system 100 to select a set of connections to help the user with account recovery in case the user's account is locked in future for any reason. In another embodiment, the user interface manager 260 may provide the user interface to the user allowing the user to select 310 connections for assisting the user in the account recovery process subsequent to the user account being locked.

The account recovery manager 245 may automatically select a set of connections for the user to assist the user in the account recovery process using the real-world interaction analyzer 265. The real-world interaction analyzer 265 uses the previous interactions between the user and the user's connections to determine connections of the user that are likely to interact with the user in the real-world. In an embodiment, the real-world interaction analyzer 265 selects users that are determined to have had real-world interactions with the user, for example, connections that the user is likely to have met in person. The selection of users with real-world interactions with the user increases the chances that the user can communicate with these connections outside of the social networking system 100 and can have interactions that are not online. The set of connections selected by the real-world interaction analyzer 265 may be presented to the user to allow the user to further shortlist the connections for participating in the account recovery process. In some embodiments, the real-world interaction analyzer 265 selects the connections for helping the user with the account recovery process without assistance from the user.

The account recovery manager 245 sends instructions to the user and/or the selected connections to communicate with the selected users via mechanisms that are different from online mechanisms, for example, by phone or text messaging. The communications outside the social networking system 100 are trusted more than communications based on the social networking system since the user account is known to have been compromised and there is likelihood that an unauthorized user has access to the user account. Therefore, connections of the user communicating via the social networking system with the user cannot be sure if they are communicating with the user or the unauthorized user. In an embodiment, a user may have a set of trusted connections that may or may not be real-world connections. For example, a user may interact very frequently and regularly with another user via online communication mechanisms even though the two users have never met in person. A user can provide a list of trusted connections for helping the user with authentication, for example, if the user account is locked.

The account recovery manager 245 sends 320 access codes to the selected connections. The user interface manager 260 may present a user interface to the user allowing the user to indicate when the social networking system 100 can send the access codes to the selected connections. The notification manager 255 sends a message comprising an access code to each connection selected for assisting the user with the account recovery process. The account recovery manager 245 requests 330 the user to obtain the access codes from the selected connections via a mechanism outside the social networking system 100 and provide them to the social networking system 100. In an embodiment, the account recovery manager 245 instructs the user to obtain at least a threshold number of access codes.

After the user obtains the access codes from the selected connections, the user provides the access codes to the social networking system 100. The account recovery manager 245 receives 340 the access codes from the user and compares the received access codes with the access codes sent to the selected connections. The account recovery manager 245 checks 350 if more than a threshold number of access codes received from the user match the access codes sent to the connections. If the user successfully provides more than the threshold number of access codes that were sent to the selected connections, the user is granted 360 access to the user account. If the user fails to provide more than threshold number of access codes, for example, by providing incorrect access codes or providing fewer than required access codes, the user is not granted access to the user account and the steps 340, 350 are repeated.

In an embodiment, the social networking system 100 verifies that the user interactions performed for account recovery are performed from a client device 220 that was previously used by the user in the past. The client device can be identified based on information received with a session created using the client device, for example, an IP address of the client device, machine cookies stored on the client device etc.

In an embodiment, the user selects a single connection to assist in the account recovery process and is required to provide the single access code that is sent to the connection. However, the account recovery manager 245 can control the level of authentication by changing the number of connections to whom access codes are sent and the number of access codes that the user is required to return. For example, if the user account is suspected of significant malicious activity that provides a strong indication that the user account has been compromised and is being used for malicious purposes, the number of connections that the user is required to select and the number of access codes that the user is required to provide is higher than the situation where the likelihood of the account being compromised is relatively low. Accordingly, the number of access codes that the user is required to provide in order to get access to the locked account depends on the type of suspicious activity associated with the account or a degree of maliciousness associated with the activity (e.g., sending viruses using the account is more malicious than sending simple spam messages.) The security module 250 may provide a score indicating a likelihood of the user account being compromised.

FIG. 4-8 show examples of user interfaces provided by the user interface manager 260 for allowing the user to interact with the social networking system 100 to perform the account recovery process. The steps illustrated by the FIG. 4-8 assume that the user account is locked due to suspicious activity and the user has requested the social networking system 100 to perform the account recovery process.

Figure 4:
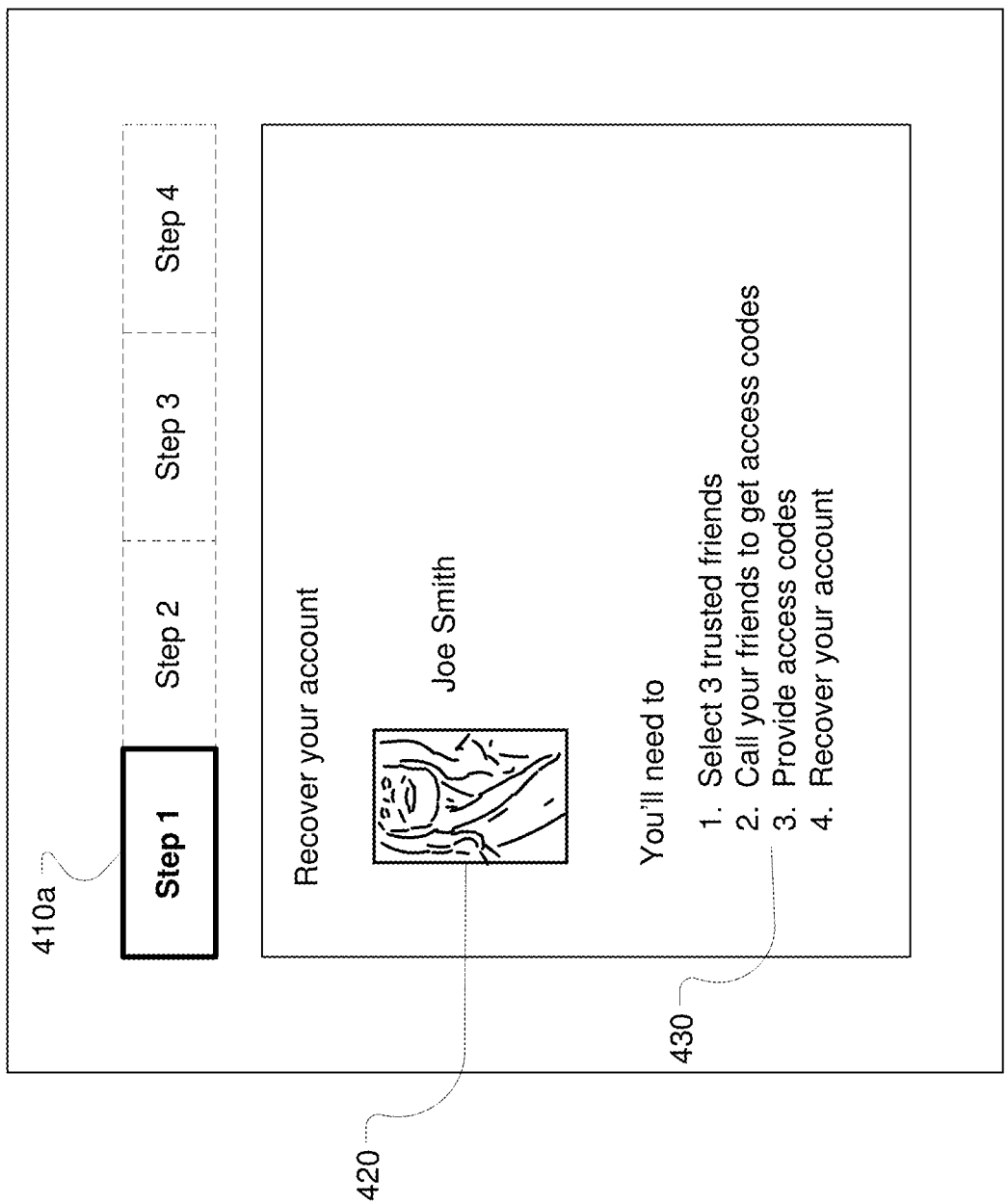
FIG. 4 shows an example user interface for providing account recovery instructions to a user, in accordance with an embodiment of the invention.

FIG. 4 shows an example user interface for providing account recovery instructions to the user. In an embodiment, the information identifying the user including the user's name and photo 420 may be presented. The various actions 430 that the user needs to perform are shown to the user including selection of a number of connections (also referred to as friends), collecting access codes from the selected connections preferably by calling them, and provide the access codes to the social networking system 100 to recover the account. The step 410 of the account recovery process corresponding to the user interface currently presented may be shown as part of the user interface.

Figure 5:
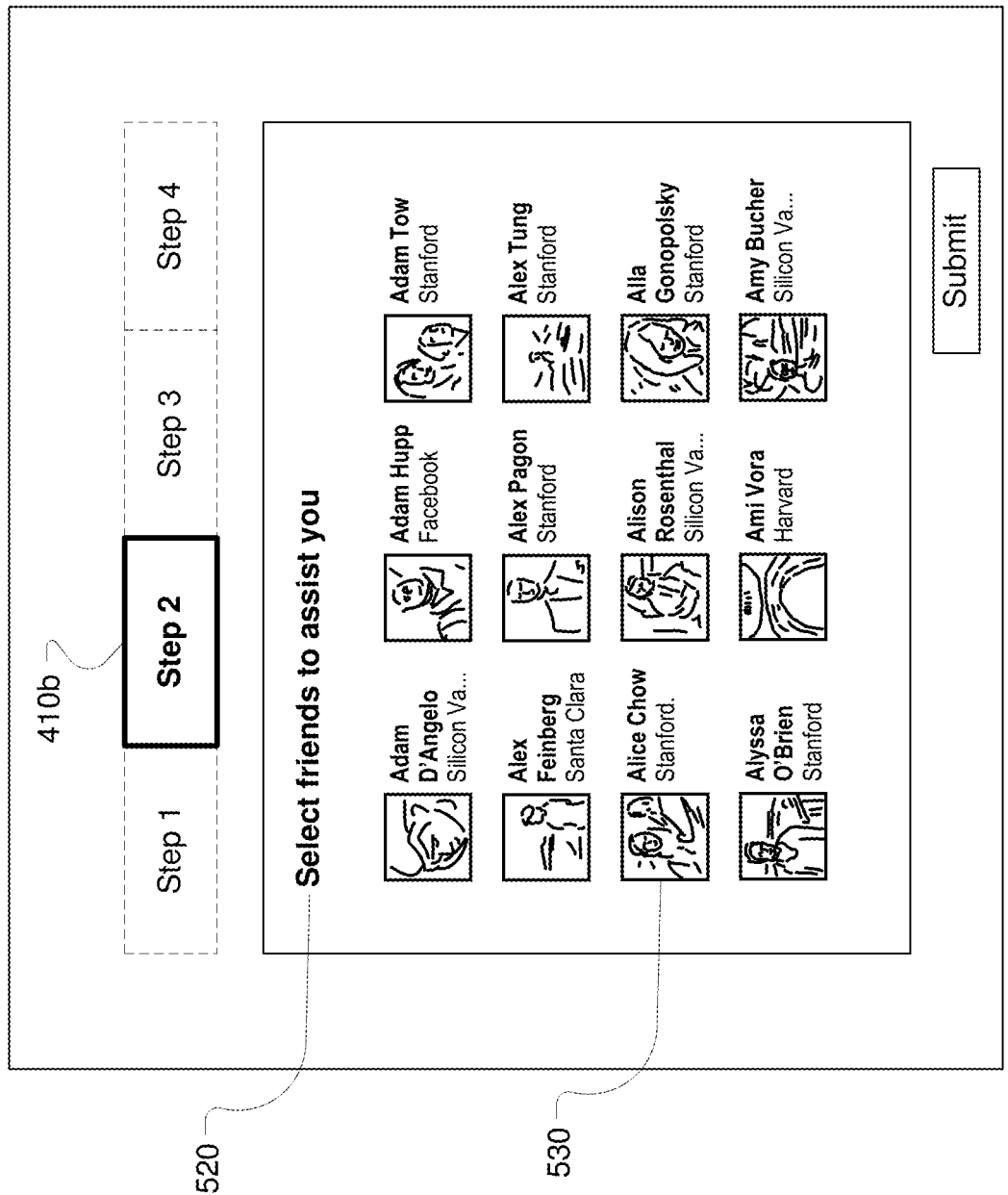
FIG. 5 shows an example user interface for allowing the user to select a set of connections for assisting the user in account recovery, in accordance with an embodiment of the invention.

FIG. 5 shows an example user interface for allowing the user to select a set of connections for assisting the user in account recovery. In the embodiment shown in FIG. 5 the user is allowed to provide input determining the connections to be used in the account recovery process. In other embodiments, the social networking system 100 can select the connections of the user for helping the user and inform the user of the selected connections. Alternatively, the social networking system 100 can select a set of connections and allow the user to select a subset of these connections. The social networking system 100 can also provide different sets of connections to the user and allow the user to select a limited number of connections from each set, thereby ensuring that the connections used for account recovery process are not all closely connected. This process avoids the possibility of a set of close connections getting together and playing a joke on the user, thereby attempting to defeat the purpose of selecting connections for assisting with the account recovery process.

Figure 6:
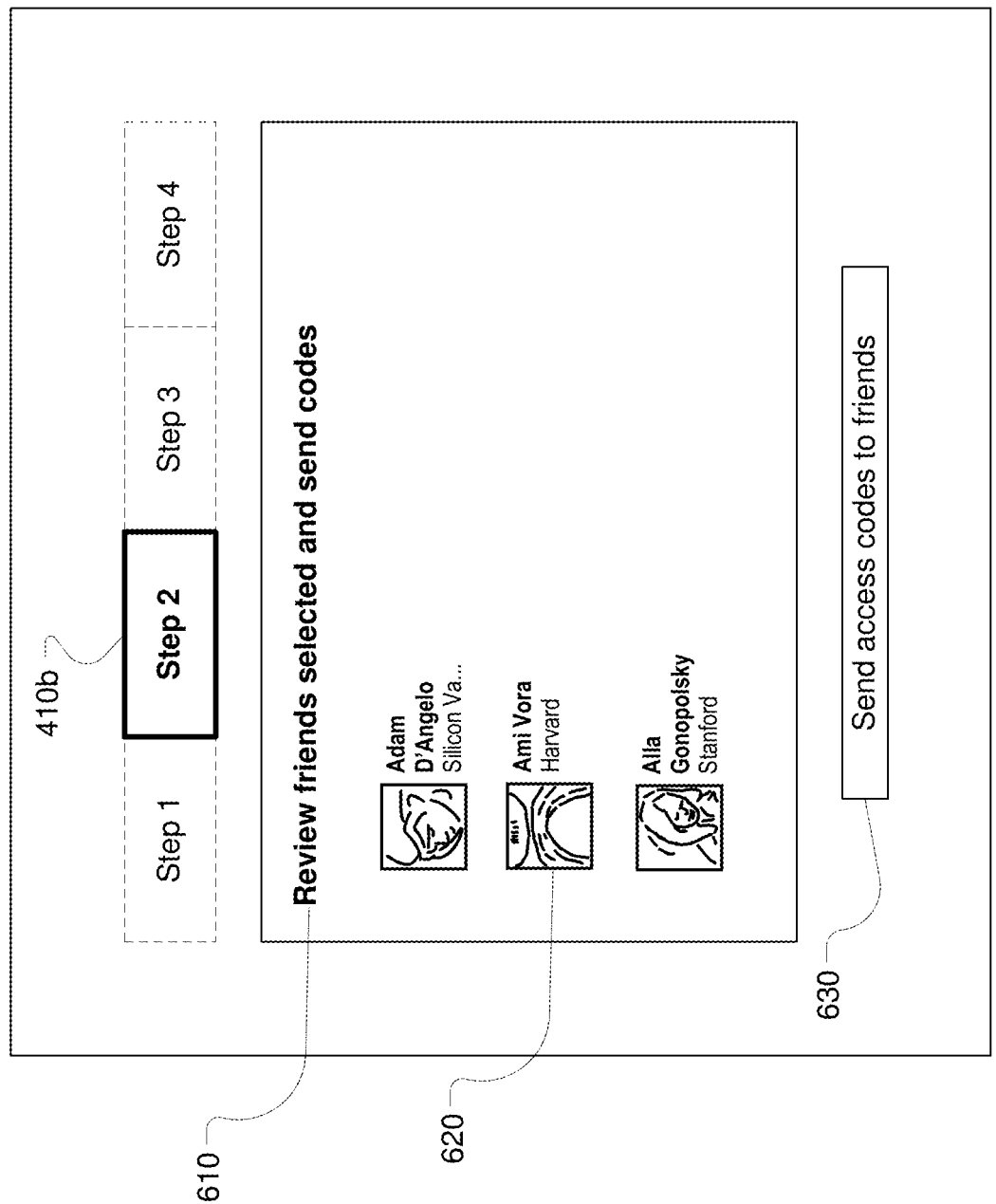
FIG. 6 shows an example user interface for allowing the user to send access codes to the selected connections, in accordance with an embodiment of the invention.

FIG. 6 shows an example user interface for allowing the user to send access codes to the selected connections. The social networking system 100 presents the selected set of connections 620 to allow the user to review 610 the selected set. After reviewing the set of connections selected to assist the user with the account recovery process, the user can request 630 the social networking system 100 to send access codes to the selected connections.

Figure 7:
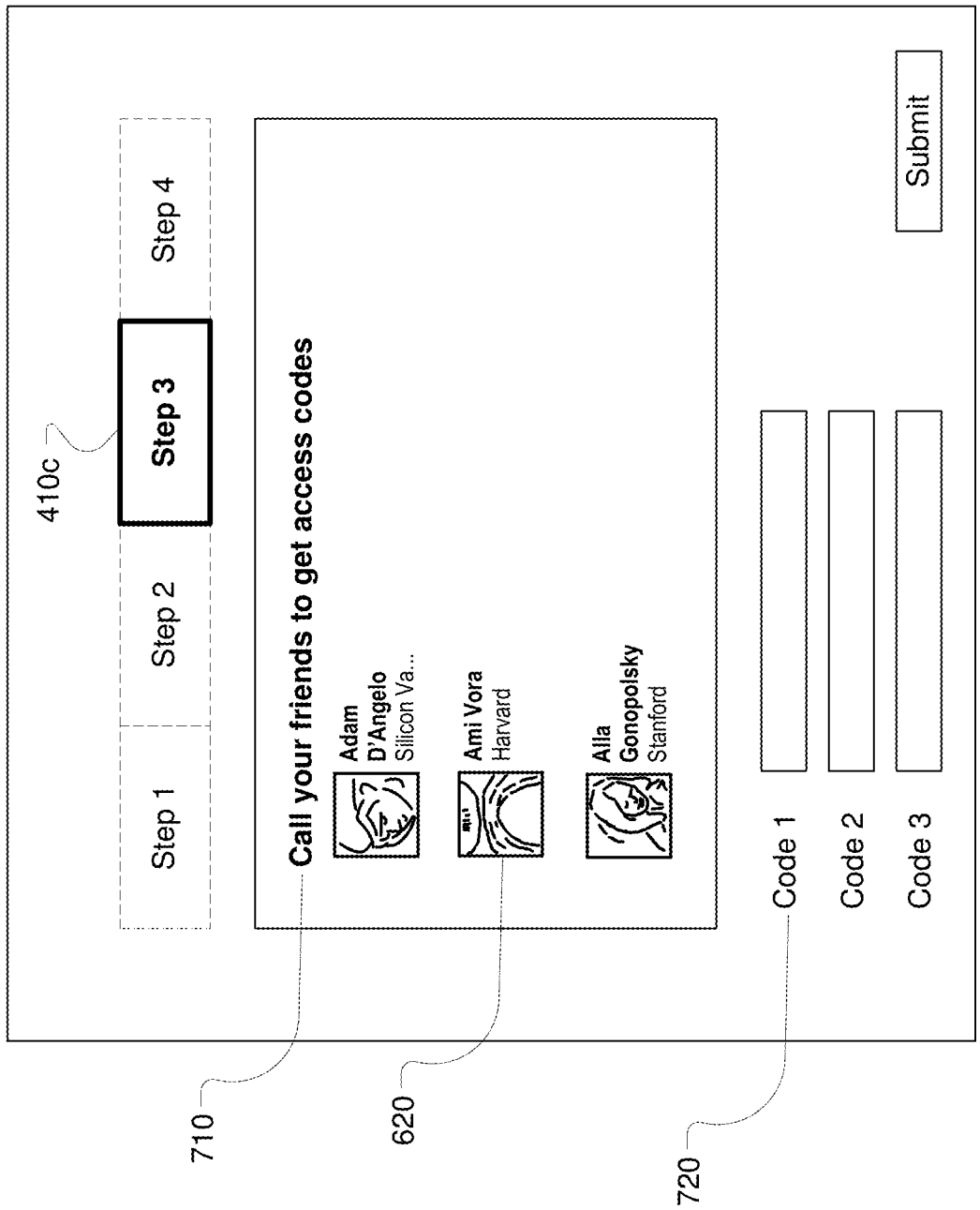
FIG. 7 shows an example user interface for allowing the user to enter access codes obtained by the user from the selected connections, in accordance with an embodiment of the invention.

FIG. 7 shows the example user interface for allowing the user to enter access codes obtained by the user from the selected connections. The user is instructed 710 to call the selected connections to obtain the access codes sent to them. The user interface shown in FIG. 7 allows the user to enter 720 the access codes obtained from the connections. If the user manages to provide the required number of access codes, the user is granted access to the account as shown in FIG. 8.

Figure 8:
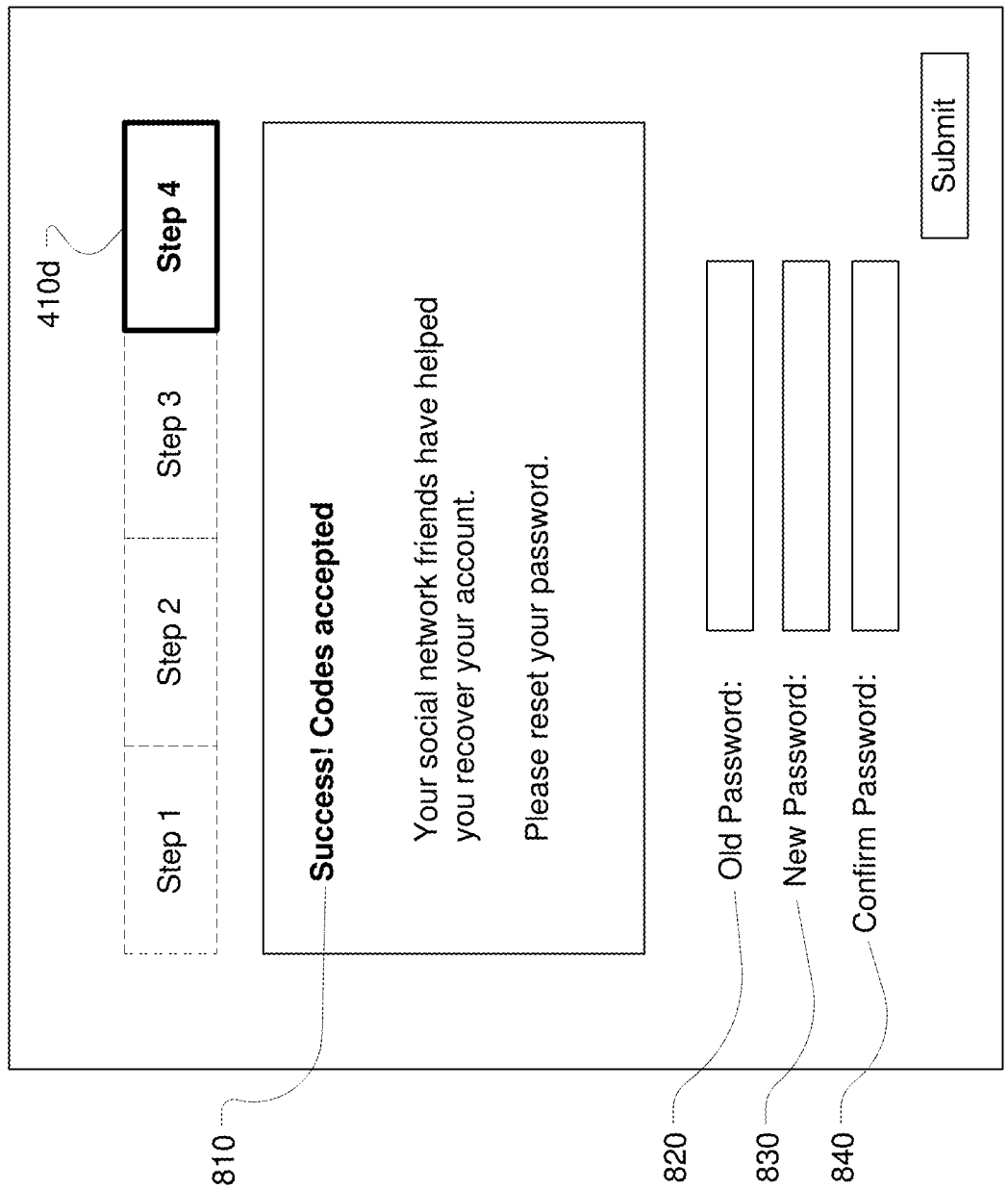
FIG. 8 shows an example user interface for allowing the user to reset the user's password in response to a successful account recovery, in accordance with an embodiment of the invention.

FIG. 8 shows the example user interface for allowing the user to reset the user's password in response to a successful account recovery. The user is informed 810 that the account recovery process has succeeded. The user is also allowed to reset the password of the account as part of the account recovery process. In an embodiment, the user may be required to provide the old password while resetting the password for additional security.

In an embodiment, the account recovery manager 245 sends the recovery codes to the user and retrieves them from the connections of the user. Since the user account of the user in the social networking system is suspected of being accessed by unauthorized user(s) and is locked, the access codes are sent to an account different from the user account in the social networking system. For example, the access codes may be sent to an alternate email address provided by the user that is associated with an account distinct from the user account in the social networking system 100. Alternatively, the social networking system 100 may send the access codes via text message to the user. In an embodiment, the social networking system 100 may send a voice message to the user's phone or use personnel to call the user and provide him with the access codes. Alternatively, the social networking system 100 can use application programming interface (APIs) provided by phone services to automatically generate and deliver a voice message to the user's phone.

Providing the access codes to the user via phone may be more reliable compared to online methods since the phone is a physical device in possession of the user and not an online entity and it is less likely that an unauthorized user gains access to the user's social networking account as well as the user's phone. On the other hand, there is a higher likelihood that an unauthorized user gains access to multiple online accounts of the user.

The social networking system 100 can maintain personnel to call the user to provide the user with access codes. Maintaining personnel for calling users can have higher costs compared to automatic mechanisms. Nevertheless, the personnel are performing simpler activities compared to personnel performing complete verification of user identity and have to spend less effort. The level of authentication required by the social networking system 100 personnel for providing access codes to the user can be less stringent compared to a full authentication process on the phone since the user has other steps to complete before the authentication is determined to be complete, i.e., sending the access codes to the selected connections and ensuring that the selected connections provide the access codes to the social networking system 100. These additional steps are equivalent of enhanced authentication since each selected connection provides authentication by providing the access codes on behalf of the user. Accordingly, the entire process is likely to fail only if the unauthorized user manages to get the access codes from the social networking system 100 and manages to convince all the selected connections to provide the access codes to the social networking system 100. This is highly unlikely to occur, and therefore the process is determined to be a reliable process for authenticating the user.

In an embodiment, the social networking system 100 informs the user to provide the access codes sent to the users to the selected set of connections of the user. The process of selection of the connections of the user for assisting the user with the account recovery process is as described herein, for example, as described in step 310 of FIG. 3. The account recovery manager 245 waits for the selected connections to provide the access codes to the social networking system 100. If more than a threshold number of selected connections of the user provide the access codes successfully to the social networking system 100, the security manager 250 grants the user access to the user's account. In this embodiment, the social networking system 100 can also perform the cluster analysis of the connections to ensure that all selected connections of the user do not belong to the same cluster.

In an embodiment, the account being recovered may not be an account of the social networking system 100 but an account of an external system. The social networking system may provide an API that allows the external system to retrieve a set of connections of the user to be assist the user in the account recovery process. The availability of social information associated with users allows the social networking system 100 to determine connections that the user actively interacts with. An external system that lacks the social information may not be able to determine whether the users selected for assisting with the account recovery process are strangers with respect to the user recovering the account and possibly collaborating with the unauthorized user.

In an embodiment, the social networking system 100 analyzes the selected connections to determine whether all the selected connections are all closely connected to each other. If all the selected connections are closely connected to each other, there is a possibility that they play a joke on the user to gain unauthorized access to the user account, or prevent the user from gaining access to the account, or be actually malicious to the user. To solve the problem of all selected connections playing a joke on the user, the social networking system 100 ensures that the selected connections belong to different portions of the social graph of the user (the social graph of the user represents the connection between the friends of the user). For example, the selected connections may preferably be friends of the user that are not directly connected to each other. Alternatively, the social networking system 100 analyzes the connections of the users to ensure that not all selected connections have frequent interactions with each other. The social networking system 100 can also ensure that connections of different types of relations with the user are selected, for example, some selected connections of the user are friends of the user where as some selected connections are family.

The social networking system 100 can also analyze common features between the selected connections, for example, whether all the selected connections graduated from the same program in the same year from an educational organization or whether all selected connections are currently students at the same educational organization or the same educational program or whether they work at the same work place. If these or similar features associated with the selected connections are identified, the social networking system 100 can present a different set of connections to the user to select from.

In an embodiment, the social networking system 100 determines clusters of the connections of users based on features of the connections. For example, clusters of the users may be determined such that users within a cluster interact with each other more frequently than users across clusters. When the account recovery manager 245 selects connections to assist a user with account recovery, the account recovery manager 245 attempts to obtain the connections from as many diverse clusters as possible. For example, if the account recovery manager 245 determines that N number of connections are needed to assist the user with account recovery process, the account recovery manager 245 determines N clusters and picks one connection from each cluster. Accordingly, the account recovery manager 245 attempts to maximize the number of clusters used to select the connections.

In an embodiment, the user can provide answers to security questions associated with the user to a few trusted connections of the user. If the user account gets compromised and the user account is stolen there is a possibility that the answers to security questions of the user are stolen as well. Therefore asking the user to provide answers to security questions is no longer a feasible mechanism to authenticate the user, since the social networking system cannot verify if the answer is provided by the authentic user or by a user with unauthorized access to the user's information. Therefore, the social networking system 100 asks a connection of the user to provide answer to the security question.

The user may have provided answers to the security questions to the user's trusted connections prior to the user account being compromised. Alternatively the user may provide answers to the security questions as part of the account recovery process subsequent to the user account getting locked.

In an embodiment, the user sends a request to access certain information to a request to recover the user account. The account recovery manager 245 asks the user to select one or more connections to assist the user in the authentication process. In an embodiment, the account recovery manager 245 suggests connections to the user to select from. The connections suggested by the user can be the connections determined to have real-world interactions with the user. The account recovery manager 245 sends a request to the selected connections to provide answers to security questions on behalf of the user. The user may provide the answers to the connections via phone or a communication mechanism not involving the social networking system 100. The account recovery manager 245 may require all the connections to answer the same security question or may require different connections to answer different security questions for the user.

The social networking system 100 can send the user information describing each connection that the account recovery manager 245 is sending a request to and the corresponding question being sent to the connection. The user can provide the required answer to the appropriate connection. The social networking system 100 receives the answers from the selected connections and compares the answers against the stored answers previously provided by the user. If more than a threshold number of answers match, the user is granted the requested access to the information, for example, an access to the user account.

In an embodiment, if the account recovery manager 245 determines the authentication process described herein has been successfully executed and the user can granted access, for example, by allowing password to be reset, the account recovery manager 245 waits for a predetermined time interval before granting access to the account. The account recovery manager 245 sends message(s) to the user, informing the user the password to the user account can be reset after a 24-hour lockout period. The user is informed of the password reset via various possible communication mechanisms that the social networking system 100 can use to communicate with the user, for example, via various email addresses provided by the user, via phone, text message, etc. The lockout period allows the actual user of the account to take action in case the account recovery process was started by an unauthorized user. For example, if an unauthorized user managed to start the account recovery process and successfully managed to get the password of the account reset, the social networking system 100 attempts to communicate with the actual user to inform the actual user that the account password is being reset. If the social networking system 100 successfully manages to communicate with the actual user and the account recovery was initiated by an unauthorized user, the actual user gets a time window (e.g., 24-hour window corresponding to the lockout period) to take action, for example, by disabling the user account, cancelling or blocking the password reset process, or by communicating with the social networking system 100 regarding the unauthorized access.

The process disclosed for performing account recovery for a user allows account recover that preferably avoids use of personnel for the social networking system. As a result cost of maintenance of the account recovery system for the social networking system 100 is reduced. The user can use the help of the users connections to recover access to account. If the connections selected for assisting in the account recovery are users that frequently interact with the user, the account can be recovered significantly fast compared to a process that requires sending identification information to the personnel managing the social networking system or other time consuming steps performed by the personnel managing the social networking system.

Identifying Real-World Interactions Between Users of Social Networking System

A user of a social networking system 100 may establish connections based on various criteria including, a business relationship, an online relationship, as a fan of a celebrity, a college friend, room-mate, family, and the like. The user can have several connections but have real world interactions with only a subset of the connections. A real-world interaction is based on interactions between users that are carried outside the social networking system 100. An example of real-world interaction is a user of the social networking system 100 meeting another user of the social networking system 100 in person. Real-world interactions include interactions via phone or via text messaging that are not based on the social networking system 100. A message sent using the social networking system 100 is not a communication outside the social networking system 100.

The real-world interaction analyzer 265 analyzes information associated with users that is available in the social networking system 100 to determine a likelihood that two users have real-world interactions outside the social networking system 100, as opposed to knowing each other solely through the social networking system 100 and/or other online channels. The real-world interaction analyzer 265 can process information as it is received, for example, by interacting with other modules of the social networking system 100, including the action logger 225, notification manager 255, etc. Alternatively the real-world interaction analyzer 265 can perform offline analysis of information stored in the social networking system 100, for example, information stored in action log 240, user account store 270, or connection store 275.

The real-world interaction analyzer 265 can determine likelihood of real-world interactions between users based on various criteria including, sharing of devices between users such as client devices for connecting with the social networking system 100 or devices like cameras or camcorders used for capturing images or videos uploaded to the social networking system 100. The real-world interaction analyzer 265 can also determine likelihood of real-world interactions between users based on information indicating location of a user. For example, two users determined to be present at the same location at the same time are likely to have had real-world interactions, especially if the users are also known to frequently interact via the social networking system 100. Other types of information found within the social networking system 100 between users may be used as factors with different weights assigned to them for determining likelihood of real-world interactions between them, for example, the type of connections between two users, whether they are family or in a relationship, the frequency of interactions between the users etc.

Figure 9:
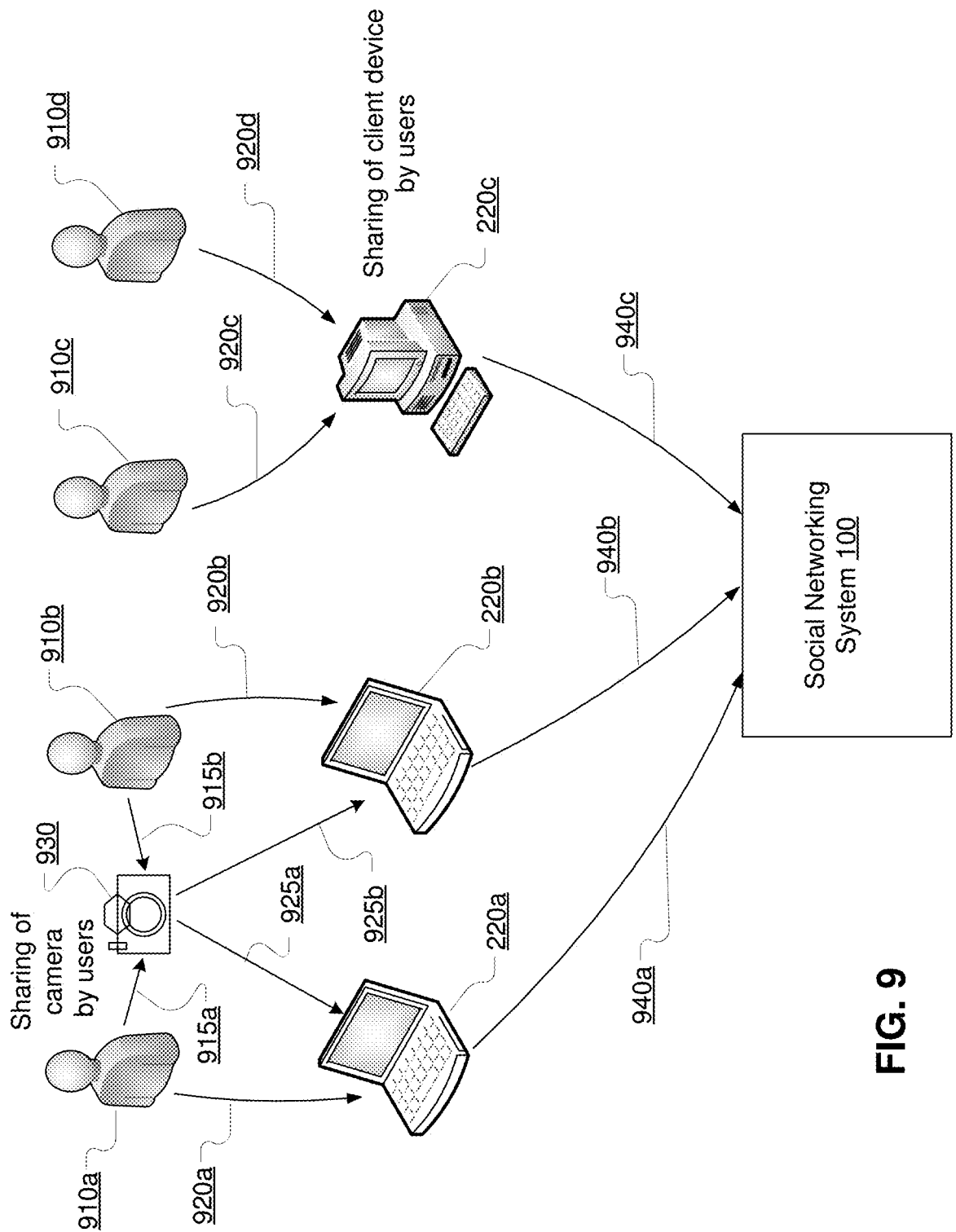
FIG. 9 shows how the social networking system can determine likelihood of real-world interactions between users based on sharing of devices by the users, in accordance with an embodiment.

FIG. 9 shows how the social networking system can determine likelihood of real-world interactions between users based on sharing of devices between users, in accordance with an embodiment. The users 910 interact 940 with the social networking system 100 via client devices 220. The client device 220 used 920 by a user 910 for creating a session with the social networking system 100 can be identified by the social networking system 100 based on information received with the requests associated with the session. For example, a request associated with a session may include an internet protocol (IP) address of the client device, cookies stored on the client device, information describing the application used to connect to the social networking system 100, and the like. This information can be used to identify a client device 220 used 920 by a user for creating a session.

Whether a client device 220 can be uniquely identified based on information available in user sessions depends on the type of information available in the sessions. For example, certain type of information is less likely to uniquely identify a client device 220 compared to other type of information. A machine cookie may be more likely to uniquely identify a client device 220 than an IP address, for example, if the client device 220 uses an internet service provider (ISP) that is likely to reassign the same IP address to another client device. However, if the client device 220 consistently uses the same IP address over a significant period of time (exceeding a threshold value), the client device 220 may be uniquely identified based on the IP address.

If the real-world interaction analyzer 265 identifies two users 910c, 910d that create sessions for interacting with the social networking system 100 that identify the same client device 220c, real-world interaction analyzer 265 determines that the two users are likely to have real-world interactions with each other. Users sharing client devices are likely to have real-world interactions with each other since they are likely to interact with each other in person, for example, people that are room-mates or family.

Even if the information identifying the client device or any other device associated with a user cannot be uniquely identified, if the corresponding information between two users matches, the information can be used to determine a likelihood of real-world interactions between two users sharing the information. If the information provides a high degree of certainty regarding the client device used by the users, the score determining the likelihood of real-world interactions between the users is high. On the other hand, if the information provides a small degree of certainty regarding the client device used by the users, the score value is low.

In an embodiment, the real-world interaction analyzer 265 uses the total number of users that share a client device as a factor in determining the likelihood that two users have real-world interactions with each other. A public computer, for example, a computer provided in a library may be used by a large number of users. Therefore, if a client device is shared by a significantly large number of users (above a threshold value), the weight of factor associated with client device sharing may be reduced in determining the likelihood of real-world interactions of two users. Similarly, repeated client device sharing over a long period of time between two users is given higher weight by the real-world interaction analyzer for determining real-world interactions between users. Identification of locations of client devices based on information available in user sessions is disclosed in U.S. application Ser. No. 12/646,800 filed on Dec. 23, 2009, which is incorporated by reference in its entirety.

Another type of device sharing that is analyzed by the real-world interaction analyzer 265 is sharing of cameras or camcorders or video recorders by users. As shown in FIG. 9, the camera 930 is shared by the users 910a and 910b. The users 910a and 910b may use 915a the camera to capture images or videos (a reference to an image includes a corresponding embodiment based on a video). These images can be transferred 925a, 925b to their respective client devices 220a, 220b by the users 910a, 910b. The users 910a, 910b can use 920a, 920b their client devices 220a, 220b to upload 940a, 940b the images to the social networking system 100.

The social networking system 100 can analyze the images uploaded by the user to determine information uniquely identifying the camera. The information used to identify a camera used to capture an image includes metadata associated with the camera available in the image, for example, a serial number, model number, or make of the camera, naming convention of files used for storing the image, and camera artifacts, including, lens scratches, faulty pixels, dust identified on lens, and the like. Identification of cameras used to capture an image and associating users based on sharing of cameras are disclosed in U.S. application Ser. No. 12/884,119 filed on Sep. 16, 2010 and U.S. application Ser. No. 12/884,137 filed on Sep. 16, 2010, each of which is incorporated by reference in its entirety.

Figure 10:
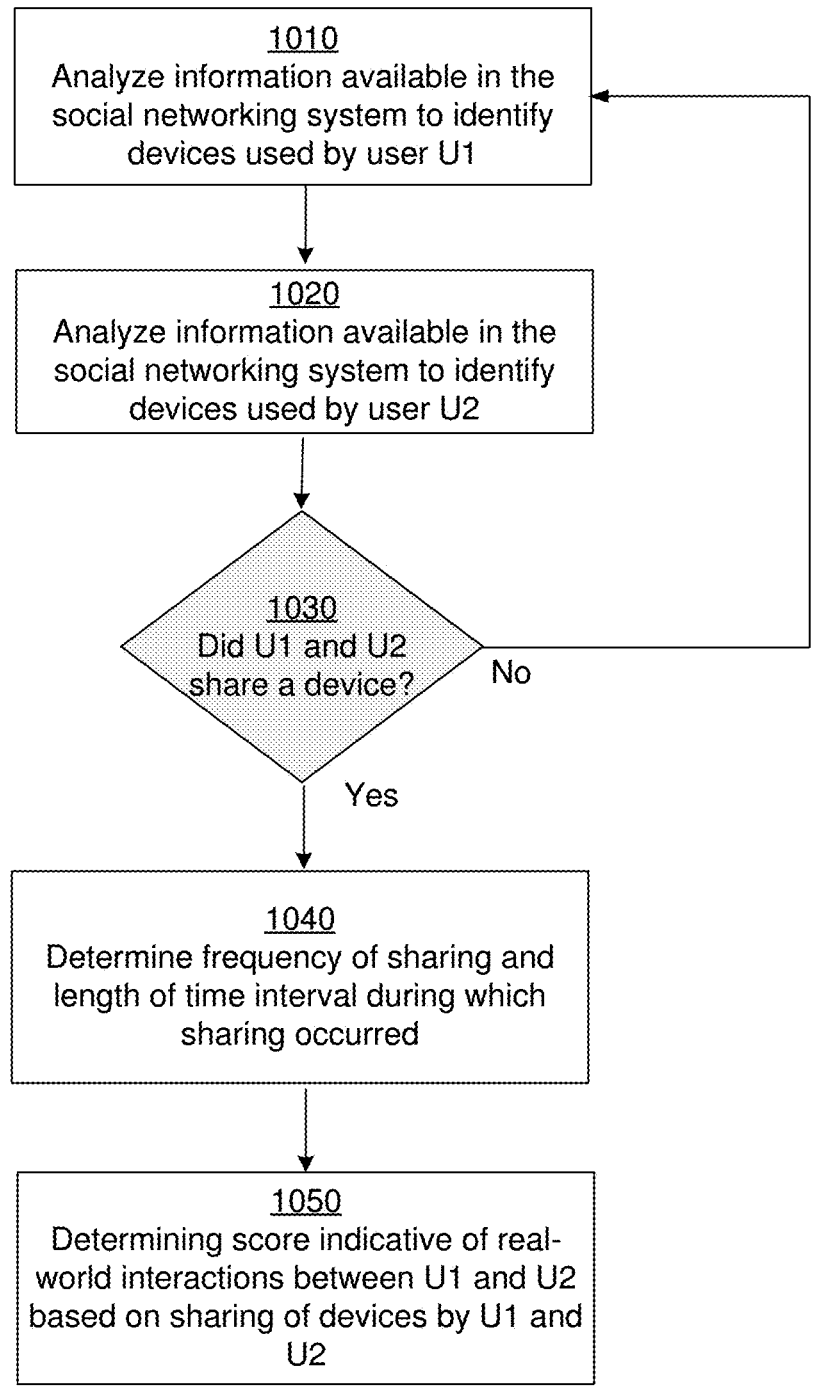
FIG. 10 shows a flowchart of a process for determining likelihood of real-world interactions between users based on sharing of devices by the users, in accordance with an embodiment of the invention.

FIG. 10 shows a flowchart of a process for determining likelihood of real-world interactions between users based on sharing of devices by the users, in accordance with an embodiment of the invention. The real-world interaction analyzer 265 analyzes 1010 information associated with a user U1 in the social networking information to identify one or more devices used by the user U1. The real-world interaction analyzer 265 also analyzes 1020 information associated with another user U2 in the social networking information to identify one or more devices used by the user U2. Examples of devices used by users that can be identified based on information describing the users stored in the social networking system 100 include client devices used to interact with the social networking system 100 and cameras or camcorders used to upload images/videos to the social networking system 100 as described in FIG. 9.

The real-world interaction analyzer 265 compares the devices used by the users to determine 1030 whether the two users shared a common device. In an embodiment, the real-world interaction analyzer 265 may compare devices used by the connections of a user with the user to determine 1030 whether they shared a device. If the real-world interaction analyzer 265 determines 1030 that the identified devices are not shared, the real-world interaction analyzer 265 selects other users U1 and U2 and repeats the steps 1010, 1020.

In an embodiment, the real-world interaction analyzer 265 identifies the various devices used by users of the social networking system 100 and identifies users that used each device to identify device sharing by users. In an embodiment, the real-world interaction analyzer 265 attaches low weight to interactions based on sharing of devices that are also shared by large number of users for determining real-world interactions between the users.

If the real-world interaction analyzer 265 determines 1030 that the identified devices are shared, the real-world interaction analyzer 265 further analyzes 1040 the frequency of sharing of devices between the users. For example, users that share a device repeatedly and/or for a long duration of time are considered more likely to have real-world interaction compared to users that shared a device only a few times. Furthermore, the time interval during which the two users used the device is analyzed to determine whether the users are likely to interact in the real-world. For example, if user U1 used the device during a certain period and user U2 used the device in a completely different time interval that occurred after a long period, say several years, it is possible that the two users happened to use the same device but never had real world interactions. For example, a client device 220 or a camera may have been sold by a user of the social networking system 100 that was ultimately purchased by another user of the social networking system 100. As a result stored information in the social networking system 100 indicates that the two users used the same device but they are unlikely to have real world interactions.

The real-world interaction analyzer 265 uses the device sharing information along with the frequency and duration of sharing to determine a score indicative of real-world interactions between two users. Longer duration and higher frequency of sharing of devices results in higher score indicative of real-world interactions between the users. Similarly, higher the certainty with which sharing of device is determined, higher the score indicating real-world interactions between the users.

Figure 11:
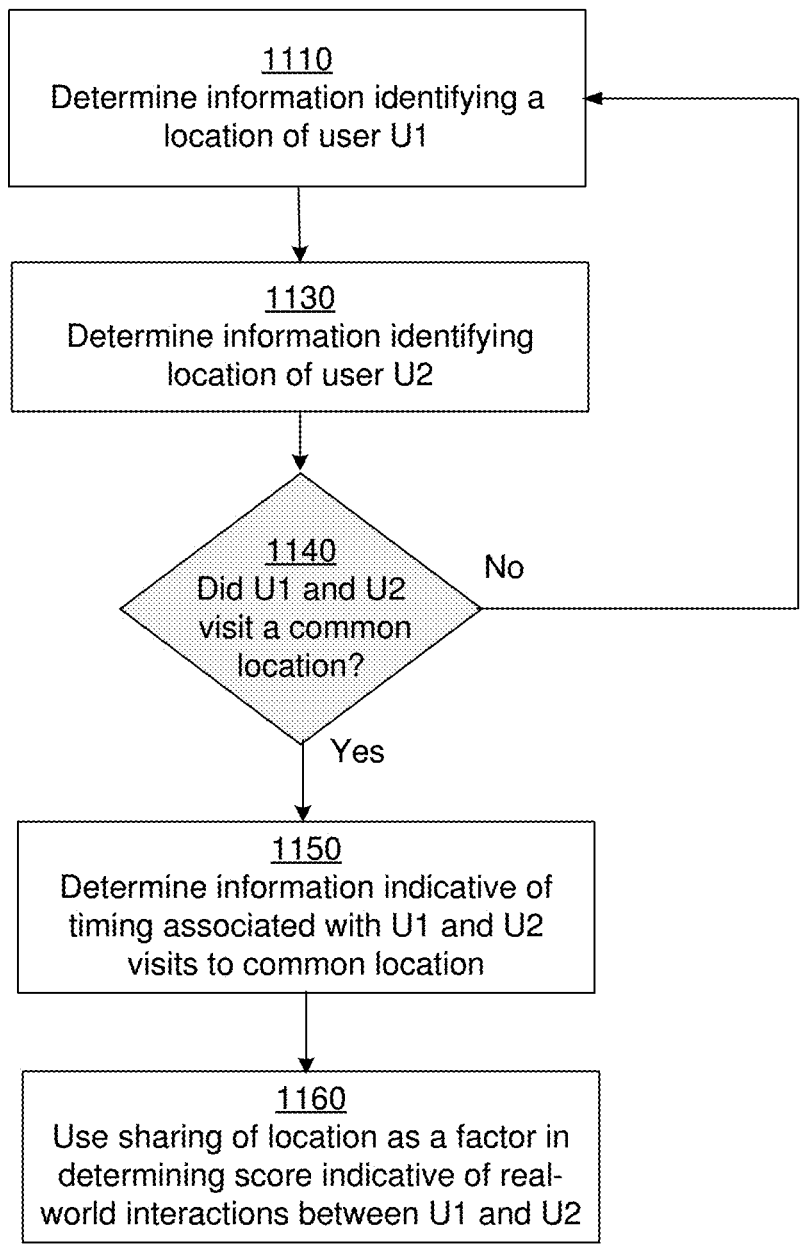
FIG. 11 shows a flowchart of a process for determining likelihood of real-world interactions between users based on sharing of locations by the users, in accordance with an embodiment of the invention.

FIG. 11 shows a flowchart of a process for determining likelihood of real-world interactions between users based on sharing of locations by the users, in accordance with an embodiment of the invention. The real-world interaction analyzer 265 determines information identifying location of a user U1. The real-world interaction analyzer 265 further determines 1130 information identifying location of another user U2.

The information identifying location of a user includes information received from sessions created by users, user profile information, information received as part of images uploaded by the user and the like. For example, the metadata of an image in which the user is tagged may provide coordinates of the location at which the image was taken if the camera is equipped with global positioning system (GPS). Similarly, a client device 220 used by a user for interacting with the social networking system 100 may be equipped with a GPS device and may provide the location of the client device 220. The session created using a client device may send the IP address of the client device. The IP address can be mapped to a geographical location, thereby providing the location of the client device. In an embodiment, the social networking system 100 may allow a user to specify the user's availability at a location by sending a special request (called checking in to a location). For example, a user can check-in to an airport location to indicate his presence at the airport to another. Or several users may check-in to a restaurant to let each other know when they arrive at the restaurant.

The real-world interaction analyzer 265 uses the location information from users U1 and U2 to verify 1140 if the two users shared a location. If the real-world interaction analyzer 265 determines 1140 that the identified users never shared any location, the real-world interaction analyzer 265 selects other users U1 and U2 and repeats the steps 1110, 1120.

The real-world interaction analyzer 265 performs further analysis to determine the timing of the events indicating the presence of the users in the common location. The information indicating sharing of location by two users is used as a factor in determining a score for the two users indicating the likelihood that the two users interact in real-world.

The timing of the events indicating presence of the users in a location may indicate that the users were present at the same location at the same time, for example, two users checking-in to a restaurant within a small time interval, or two users tagged in the same photo. The real-world interaction analyzer 265 determines a high likelihood of two users having real-world interactions of they are determined to be present in the same location at the same time. The real-world interaction analyzer 265 analyzes the frequency and duration of time interval during which the two users have visited the same location. For example, if two users are determined to work in a place and have regularly visited the work place for several years, the likelihood of these two users having real-world interactions is higher than two users determined to have visited a particular location only a few times. In contrast, if the real-world interaction analyzer 265 identifies information indicating that the two users visited the same location but at significantly different times, the fact that the two users visited the same location is weighted low in determining the likelihood of real-world interactions between the users.

For example, if two users connected to each other in the social networking system 100 indicate that they checked-in to a restaurant at the same time, the real-world interaction analyzer 265 can determine a high likelihood that the two users interact with each other in real-world. Similarly, if two users are tagged in the same photo, even if the location of the place where the photograph was taken may not be known, the real-world interaction analyzer 265 determines a high likelihood that the two users interact with each other in real-world. Two users appearing in the same photo can be assumed to be physically present at the same location, even if the exact location where the two users were present is not known.

If two users that indicate that they have the same work place in their user profile, there is a possibility that the information may be stale or incorrect or deliberately falsified. Information based on user sessions can be used to confirm their location, for example, based on IP addresses of their client devices. If the two users are also connected in the social networking system 100 and have frequent interactions with each other, the two users are likely to have real-world interactions.

Interactions within the social networking system 100 may not be an indicator of high likelihood of real world interactions by itself. Two users may interact with each other via the social networking system 100 without having interacted with each other in real-world. However, interactions between users in a social networking system 100 combined with other factors, for example, sharing of location or sharing of device provides a confirmation that they are highly likely to interact with each other in real-world. Similarly, two users may check-in to a restaurant at the same time as a matter of coincidence and may never interact with each other in real-world. However, two users that frequently interact with each other via the social networking system 100 are likely to interact with each other in real-world if they check-in to the same restaurant at the same time.

In an embodiment, two users may indicate that they will be attending an event by sending RSVP message for the event. The indication by two users that they plan on attending the same event indicates a high likelihood that the two users interact with each other in real-world. The likelihood that the two users attending the event interact with each other in real-world is considered higher if other factors indicate that the users interact with each other regularly, for example, based on frequent interactions between the users.

In an embodiment, the messages exchanged between the users of the social networking system 100 are analyzed to identify references to locations shared by the users. For example, if the two users are determined to be present at a particular location and messages between the users mention the same location, real-world interaction analyzer 265 can determine that the presence of the two users in the same location was not a coincidence but an agreed upon event. As a result, the likelihood of these users interacting in real life is considered high.

An interaction comprising invitation to a real world event and subsequent RSVP by the other user indicates that the users are likely to have real world interactions. Users belonging to the same college network who graduated in the same time period are likely to have met in person. Text of the online exchanges between the users is analyzed to determine whether users have met in real life. Weighted scores based on various signals are aggregated to determine a metric indicative of the likelihood of a connection being a real world connection. Real world connections of a user can be used for account recovery, ad targeting, etc.

In an embodiment, the timing of the events indicative of real-world interactions is analyzed to determine how recent these events are. For example, if two users are determined to have shared a workplace but the timing of the events indicate that the two users shared the workplace several years ago, the real-world interaction analyzer 265 can weigh this factor low indicating that the likelihood of current real-world interaction may be low based on this particular factor.

In an embodiment, information indicating that the two users graduated from the same program at the same educational organization in the same year is considered indicative of high likelihood that the users interact with each other in real-world. The real-world interaction analyzer 265 further analyzes interactions between the two users. Several people may graduate from a program in a year and some of them may not interact significantly with each other. Frequent interactions between the users can be used to eliminate the possibility that the users may not have known each other well in spite of having graduated from the same program.

The information indicating likelihood of real world interactions between users can be used to promote social network growth. For example, the social network may promote an event to a user of connections of the user that are likely to have real-world interactions with the user attend the event. The information identifying these connections may be presented to the user along with information describing the event. A user is more likely to attend an event if the connections of the user that the user interacts with in real life are planning on attending the event. The information indicating likelihood of real world interactions can also be used for authentication purposes as described above, for example, for account recovery. The information can also be used for authentication purposes in case of significant transactions performed by the user, for example, certain types of financial transactions.

ALTERNATIVE APPLICATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    receiving, at a social networking system, a request for recovering an account of a requesting user of a social networking system, wherein the requesting user is connected to a plurality of users of the social networking system;
    determining by the social networking system, for each user of the plurality of users, a likelihood of a real-world relationship between the requesting user and the corresponding user;
    selecting, by the social networking system without assistance from the requesting user, a subset of the plurality of users to send a first set of access codes, the subset of users being selected by the social networking system based on the determined likelihoods of real-world relationships of the plurality of users and the requesting user;
    sending the first set of access codes to the selected subset of users;
    receiving a second set of access codes from the requesting user; and
    responsive to one or more access codes in the second set matching the access codes in the first set, granting access to the account to the requesting user.

2. The computer implemented method of claim 1, wherein determining a likelihood of a real-world relationship with a corresponding user comprises:
    identifying an image stored by the social networking system with which both the requesting user and the corresponding user are associated; and
    responsive to identifying the image, selecting the corresponding user.

3. The computer implemented method of claim 1, wherein determining a likelihood of a real-world relationship with a corresponding user comprises:
    identifying an event with which both the requesting user and the corresponding user are associated; and
    responsive to identifying the event; selecting the corresponding user.

4. The computer implemented method of claim 1, wherein determining a likelihood of a real-world relationship with a corresponding user comprises:
    identifying a first device used by the requesting user;
    identifying a second device used by the corresponding user; and
    responsive to determining that the first device is same as the second device, selecting the corresponding user.

5. The computer implemented method of claim 4, wherein the first device and the second device are client devices used for creating sessions for interacting with the social networking system.

6. The computer implemented method of claim 4, wherein the first device and the second device are cameras used for capturing images uploaded to the social networking system.

7. The computer implemented method of claim 1, wherein determining a likelihood of a real-world relationship with a corresponding user comprises:
    identifying a first location associated with the requesting user;
    identifying a second location associated with the corresponding user; and
    responsive to the social networking sytem determining that the first location is same as the second location, selecting the corresponding user.

8. The computer implemented method of claim 7, wherein the first location and the second location correspond to a work place specified in user profiles of the requesting user and the corresponding user.

9. The computer implemented method of claim 1, wherein the requesting user is granted access to the account responsive to a number of matching access codes exceeding a predefined threshold value.

10. The computer implemented method of claim 9, wherein the predefined threshold value is determined based on a type of suspicious activity associated with the account.

11. The computer implemented method of claim 1, wherein the requesting user is granted access to the account responsive to the number of matching access codes exceeding a predefined percentage of the number of access codes in the first set.

12. The computer implemented method of claim 1, wherein the request for recovering an account is received responsive to the account being locked upon determination of suspicious activity associated with the account.

13. The computer implemented method of claim 1, further comprising sending instructions to the selected subset of users to transmit access codes to the requesting user via a communication by phone.

14. The computer implemented method of claim 1, further comprising sending instructions to the selected subset of users to transmit access codes to the requesting user via a communication outside the social networking system.

15. The computer implemented method of claim 1, further comprising:
    matching information identifying a client device used by the requesting user to recover the account with information identifying a client device used by the requesting user for past interactions; and
    wherein the requesting user is granted access to the account responsive to the matching indicating that the client device used by the requesting user to recover the account is same as the client device used by the requesting user for past interactions.

16. The computer implemented method of claim 1, further comprising determining that at least one selected user of the subset of users is not directly connected in the social networking system to the remaining users of the subset of users.

17. The computer implemented method of claim 1, further comprising:
    determining clusters of connections of the requesting user, wherein a first pair of connections both belonging to a cluster have higher degree of similarity of characteristics compared with a second pair of connections comprising connections from two different clusters; and
    verifying that the selected subset of users comprises a connection of the requesting user from at least two different clusters.

18. The computer implemented method of claim 1, wherein responsive to the one or more access codes in the second set matching the access codes in the first set, granting access to the account comprises:
    sending a message to the requesting user with information regarding the granting of access; and
    responsive to sending the message, waiting for a predetermined time interval before granting account access.

19. A non-transitory, computer-readable medium comprising instructions that, when executed by a processor, cause the processor to:
    receive, at a social networking system, a request for recovering an account of a requesting user of a social networking system, wherein the requesting user is connected to a plurality of users of the social networking system;
    determine by the social networking system, for each user of the plurality of users, a likelihood of a real-world relationship between the requesting user and the corresponding user;
    select, by the social networking system without assistance from the requesting user, a subset of the plurality of users to send a first set of access codes, the subset of users being selected by the social networking system based on the determined likelihoods of real-world relationships of the plurality of users and the requesting user;
    send the first set of access codes to the selected subset of users;
    receive a second set of access codes from the requesting user; and
    responsive to one or more access codes in the second set matching the access codes in the first set, grant access to the account to the requesting user.

\* \* \* \* \*

UNITED STATES PATENT AND TRADEMARK OFFICE
CERTIFICATE OF CORRECTION

| | |
|---|---|
| PATENT NO. | : 11,336,637 B2 |
| APPLICATION NO. | : 15/467891 |
| DATED | : May 17, 2022 |
| INVENTOR(S) | : Yigal Dan Rubinstein et al. |

It is certified that error appears in the above-identified patent and that said Letters Patent is hereby corrected as shown below:

On the Title Page

In Column 2, item (57), under Abstract, Line 7, delete "user instructed" and insert -- user is instructed --, therefor.

In the Claims

In Column 22, Claim 3, Line 11, delete "event; selecting" and insert -- event, selecting --, therefor.

In Column 22, Claim 7, Line 36, delete "sytem" and insert -- system --, therefor.

Signed and Sealed this
Ninth Day of May, 2023

*Katherine Kelly Vidal*

Katherine Kelly Vidal
*Director of the United States Patent and Trademark Office*